US005846636A

United States Patent [19]

Ruppel et al.

[11] Patent Number: 5,846,636

[45] Date of Patent: Dec. 8, 1998

[54] MULTI-LAYER SHEET OF ABSORBENT PAPER AND ITS MANUFACTURING METHOD

[75] Inventors: Rémy Ruppel, Durrenentzen; Pierre Laurent, Colmar; Joël Hungler, Urschenheim, all of France

[73] Assignee: Fort James France, Kunheim, France

[21] Appl. No.: 750,568

[22] PCT Filed: Jun. 15, 1995

[86] PCT No.: PCT/FR95/00786

§ 371 Date: Jan. 14, 1997

§ 102(e) Date: Jan. 14, 1997

[87] PCT Pub. No.: WO95/35205

PCT Pub. Date: Dec. 28, 1995

[30] Foreign Application Priority Data

Jun. 17, 1994 [FR] France .................................. 94 07482

[51] Int. Cl.[6] ................................ D06N 7/04; B32B 3/00

[52] U.S. Cl. .......................... 428/154; 428/166; 428/172; 428/198; 428/212; 156/209; 156/290; 156/292

[58] Field of Search .................................... 428/155, 172, 428/154, 167, 212, 166, 178, 137, 198; 162/112, 113, 117; 156/181, 209, 292

[56] References Cited

U.S. PATENT DOCUMENTS

| | | | |
|---|---|---|---|
| 4,307,141 | 12/1981 | Walburn | 428/132 |
| 4,320,162 | 3/1982 | Schulz | 428/154 |
| 4,483,728 | 11/1984 | Bauernfeind | 428/166 |

*Primary Examiner*—Donald Loney
*Attorney, Agent, or Firm*—Breiner & Breiner

[57] ABSTRACT

An absorbent multi-layer sheet, with at least two layers each constituted of at least one embossed ply of creped absorbent paper having a specific surface weight between 10 and 40 g/m$^2$ per ply, with an external surface forming the outer side of the multi-layer sheet and an inner surface, the inner surface of the first layer including first and second protrusions and the inner surface of the second layer including third protrusions nested between the-protrusions of the first layer, the two layers being bonded together by at least part of the protrusion tips of one layer adhesively joined to the other layer between two protrusions, is characterized in that the bonding is implemented by the first protrusions of the first layer, the second protrusions having a lesser height than the first ones and their tips being adhesive-free.

15 Claims, 2 Drawing Sheets

MULTI-LAYER SHEET OF ABSORBENT PAPER AND ITS MANUFACTURING METHOD

FIELD OF THE INVENTION

The present invention concerns the field of absorbent papers for household and sanitary use and its object is a multi-layer sheets for such products as toilet paper, handkerchiefs, napkins or paper towels, as well as its manufacturing method.

BACKGROUND OF THE INVENTION

To manufacture household and sanitary papers, the industry uses low-weight, absorbent and creped paper such as cellulose wadding, i.e., tissue paper. Creping imparts bulk to the sheet and results in improved liquid absorption, touch and softness.

To increase absorption, multi-layer sheets have been made, namely, by combining two or more plies.

Illustratively, U.S. Pat. No. 3,867,225 describes a process for manufacturing such a product and consists in separately embossing two plies of tissue paper into a pattern of protrusions at the rate of 2 to 30/cm$^2$, in applying an adhesive to the tips of some of these protrusions, in bringing close the embossed sides of the two plies (that is the sides having the protrusions) by arranging the protrusions of one side between those of the other side, and in adhesively bonding the tips of one ply to the troughs of the other ply. On account of the voids subtended between the two plies, a structure is achieved which has improved absorption over the absorbing sheets lacking this processing. In some product applications wherein softness is an important criterion, an excessive number of bonding spots between the two plies is undesirable since the total bonded area proportional to the number of such spots results in significant rigidity. Glue deposition is implemented by a glue depositing cylinder and thereby the number of bonding spots is equal to the number of protrusions of the glue-receiving ply. To lower this number of bonding spots, this patent proposes partial glue deposition by using a glue depositing cylinder of which the surface is hollowed by alveoles. Regrettably, such a solution was found to be industrially impractical because it led to rapid cylinder fouling by material accumulating in the alveoles.

U.S. Pat. No. 4,320,162 describes a multi-layer sheet composed of two embossed plies. Each ply comprises a wide pattern of first and relatively deep embossed protrusions surrounded by a more tightly arrayed pattern of more shallowly embossed second protrusions. In a first embodiment, the two plies are combined by means of the tips of the first protrusions and, in a second embodiment, by the tips of the first protrusions of a first ply and by the tips of the second protrusions of the second ply. Theoretically, such a configuration offers more inner volume than the design of U.S. Pat. No. 3,867,225 because the two plies are joined together by the tips of the protrusions. However, such a sheet is less crush-resistant, and already at low pressure, the protrusions are observed to sag.

OBJECTS AND BRIEF DESCRIPTION OF THE INVENTION

The object of the present invention is a multi-layer structure combining the advantages of the two procedures above while avoiding the drawbacks, and further the manufacturing method for the multi-layer structure.

The object of the invention is an absorbing multi-layer sheet having at least two layers each composed of at least one creped absorbing paper ply with a specific surface-weight of 10 to 40 g/m$^2$, having an external surface forming the outside of the multi-layer sheet and an inner surface. The inner surface of the first layer comprises first and second protrusions and the inner surface of the second layer comprises third protrusions nested between the protrusions of the first layer. The two layers are bonded to each other at least by some of the tips of one layer that are adhesively affixed to the other layer between two protrusions. This multi-layer sheet is characterized in that the joining or bonding is implemented by the first protrusions of the first layer, the second protrusions evince a lesser height than the first one and their tips are free of adhesive.

The invention offers a less rigid sheet than a sheet with the same number of protrusions which also are nested but all of the same height. Moreover, the crush resistance is undegraded. The total area on which adhesive is deposited is easily defined by means of the tip area of the first protrusions. The area receiving adhesive can vary from 0.1 to 20% depending on the final use of the product. As regards a sheet for making toilet paper, the adhesive-receiving area is selected to be between 1 and 5% in order to achieve optimal softness.

In another feature of the invention, the height of the second protrusions exceeds 50% that of the first protrusions. Optimal crush resistance is achieved when the second protrusions are substantially at the same level as the surface of the adjacent layer.

In another feature of the invention, the first protrusions are distributed in a well-spaced pattern, at least two second protrusions being arrayed between two first consecutive protrusions. Advantageously, the first protrusions shall reproduce a plurality of eye-pleasing effects, for example, flower(s). Such designs are surrounded by dots constituted by the second protrusions, each dot taking up only a slight area and the dot density possibly being comparatively high up to 80 or 100 dots/cm$^2$.

In another feature of the invention, the height of the third protrusions is equal to or less than the height of the first protrusions. To ensure adequate crush resistance, the height of these protrusions desirably are at least half that of the first protrusions.

In another feature of the invention, the tips of the third protrusions are adhesively bonded to the first layer.

Another object of the present invention is a method for manufacturing the multi-layer sheet above. This method for making a multi-layer sheet includes embossing a first ply, which itself is single or multiple, on a first cylinder having at its surface first and second salient elements, and a second ply which also can be single or multiple, on a second cylinder having third salient elements, depositing adhesive on at least some of the tips of the protrusions provided in one of the plies, bringing the two plies adjacent each other in such a way that the first ply protrusions nest between the second ply protrusions and in that the adhesive-endowed tips adhere to the other ply between two protrusions, characterized in that the first elements have a height H measured relative to the cylinder surface and exceed the height h of the second elements, the difference of H and h being larger than 0.05 mm, namely $H-h>0.05$ mm, and in that the adhesive deposition is carried out only on the first protrusions.

In another feature of the invention, the difference of H and h is less than 50% of H, in particular when H is between 1 and 2 mm and especially when the element height is between 1.2 and 1.5 mm. In this manner, a multi-layer sheet is achieved of which the second protrusions optimally act as struts and resist crushing.

In another feature of the invention, the third salient elements of the second cylinder have a height H' equal to or less than the height H, i.e., $H' \leqq H$.

In another feature of the invention, the second cylinder comprises salient fourth elements, the height h' of the fourth elements being less than the height H' of the third elements.

In another feature of the invention, H' and h' are related as $$0.5 \times H' \leqq h' \leqq H' - 0.05$$

In another feature of the invention, adhesive is applied both to the first and the third protrusions.

BRIEF DESCRIPTION OF THE DRAWINGS

Other features and advantages of the invention are elucidated in the following description of non-limiting embodiments and implementations of the invention in relation to the attached drawings.

DETAILED DESCRIPTION OF THE PRESENTLY PREFERRED EMBODIMENTS

Figure 1:
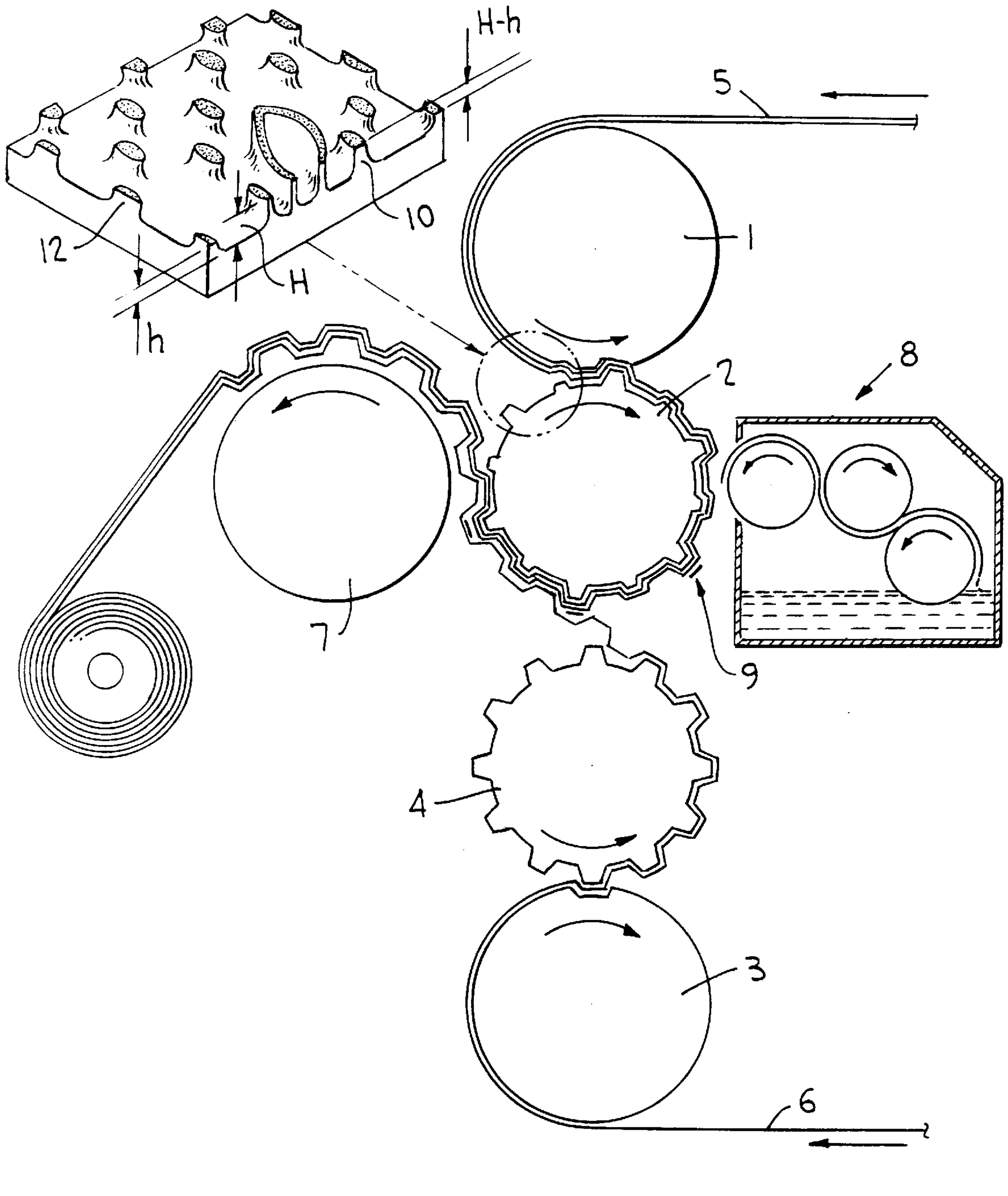
FIG. 1 illustrates apparatus implementing the method of the invention.

FIG. 1 schematically shows conventional apparatus which allows the manufacture of the product of the invention.

This apparatus comprises two embossing units each consisting of an elastomer-clad cylinder 1 and 3, respectively cooperating with an engraved steel cylinder 2 and 4. The cylinders 2 and 4 are engraved in such a manner that they comprise salient elements, i.e., pins, which are regularly arrayed both in the direction of advance and in the transverse direction.

A first ply of absorbing creped tissue paper 5 for use as sanitary or household paper such as toilet paper, handkerchief, napkin or paper towel is drawn from a reel (not shown) and made to pass around the cylinder 1. In the embodiment shown, this is a double-ply. The cylinder is pressed by suitable means (not shown) against cylinder 2 in such a manner that the ply, passing between the cylinders, is made to deform and follow the saliency of the engraving of cylinder 2. Thereafter, the ply is displaced by cylinder 2. A conventional adhesive depositing system 8 by means of an applicator cylinder deposits an adhesive 9 on the tips of the salient elements or protrusions of the ply 5.

A second ply 6 drawn from a reel undergoes similar embossing while passing between the cylinders 3 and 4. Cylinder 4 is a slight distance from cylinder 2 in order that the ply can be lifted off the surface of cylinder 4. The ply makes contact with the first ply over part of its displacement where it is still applied against the surface of the cylinder 2. The two cylinders are driven synchronously in opposite directions and are rotationally adjusted relative to each other so that the protrusions of the ply 6 are received between the protrusions of ply 5. A so-called laminator roll 7 having a smooth surface set in rotation against cylinder 2 ensures combining of the two plies by pressing ply 6 by its depressed zones, namely between two adjacent protrusions, against the adhesive-endowed tips 9 of the protrusions of ply 5. The multi-layer sheet so made is then cut into narrow sheets that are wound in rolls, for example of toilet paper.

In the invention, the cylinder comprises first and second salient elements of different heights. A partial and perspective view on an enlarged scale of the surface of cylinder 2 is shown in FIG. 1. The salient first elements 10, on which are formed the first protrusions of the first ply, have a height H and are distributed over the cylinder surface in a pattern which can be regular or not. Where the salient elements are made by engraving or milling, the height is measured from the tip of the element, which in general is fairly planar, to the bottom of the engraving. If the elements are mutually offset, the same procedure of height difference is used, the reference being the tips of the highest elements.

Figure 2:
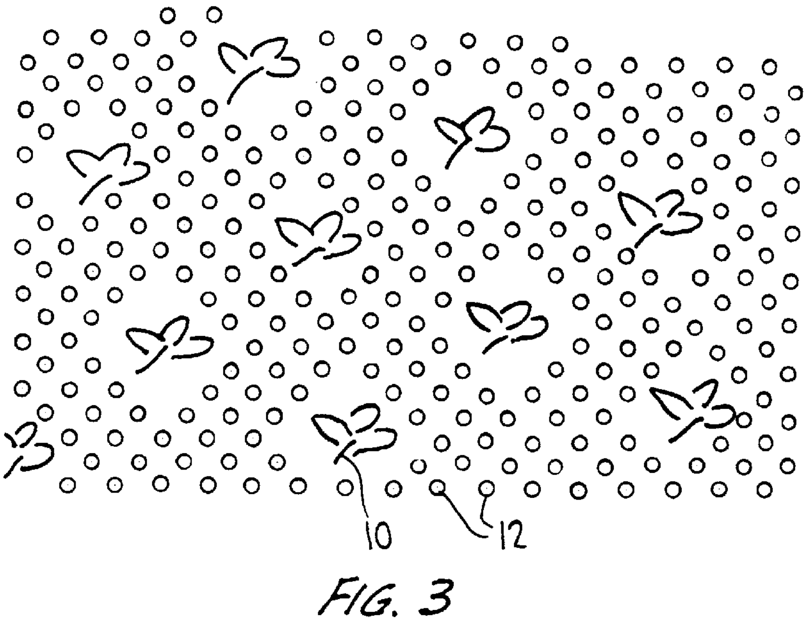
FIG. 2 illustrates a pattern of the salient elements at the surface of an embossing cylinder for one implementing mode.

These first elements can assume any shape. They are advantageously constituted to imprint a linear design, for example a flower as shown in FIG. 2. The first elements 10 are comparatively far apart from each other. In particular, such spacing is a function of the design-occupied area on the ply. Illustratively, for a design within an area of 100 $mm^2$, the distance between two first elements is 15 mm. The height H is between 1 and 2 mm. A particularly appropriate magnitude when making toilet paper from tissue paper having a specific surface weight of 10 to 40 $g/m^2$ is between 1.2 and 1.5 mm, for example 1.3 mm. Obviously, the embossing depth and the resulting protrusion heights on the ply depend on the hardness of the cladding on the cylinder 1 and on the pressure it exerts on cylinder 2.

The salient second elements 12 of lesser height h are positioned between the first and comparatively mutually distant elements. In practice, the height h is measured differentially relative to H.

These second elements in the multi-layer sheet structure must act, as do the first elements, as struts to contribute to compression resistance and to provide bulk. However, they must be sufficiently offset from the first elements to ensure that the adhesive depositing system apply adhesive only to the tips of the first protrusions of the first ply. In practice, the height h of the second elements is less by at least 0.05 mm than H but preferably it shall exceed half of H, namely, $0.5 \times H \leqq h \leqq H - 0.05$.

These elements 12 are distributed between the elements 10 in a tighter pattern. FIG. 2 is a partial top view of the distribution of the first and second elements at the surface of cylinder 2.

Figure 3:
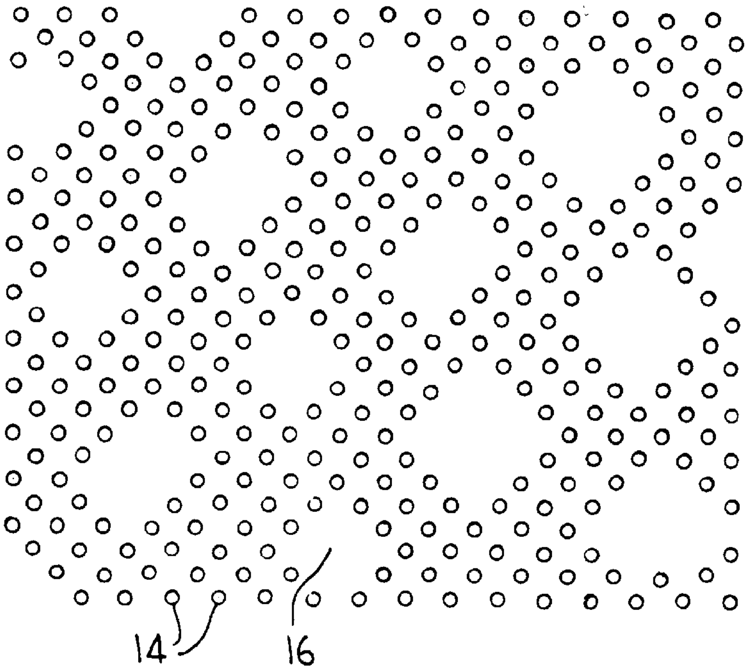
FIG. 3 illustrates a pattern of the salient elements of another embossing cylinder which cooperates with the cylinder of FIG. 2.

The cylinder 4 is engraved with a pattern matching that of cylinder 2 in such a manner that the protrusions of the second ply will nest between the protrusions of the first ply when the two plies are being joined by the method of FIG. 1. FIG. 3 is a partial top view of the salient elements 14 at the surface of the cylinder 4. Their height H' is equal to or less than that of the first elements of the first ply, i.e., $H' \leqq H$. If it were larger, the protrusions would be crushed and raised to the height H when passing through the gap between the laminator roll 7 and the cylinder 2. As is made clear by the drawing, the salient elements of cylinder 4 are distributed in the same manner as the second elements 12 of the first cylinder. They provide unembossed zones 16 into which will nest the first salient elements 10.

Figure 4:
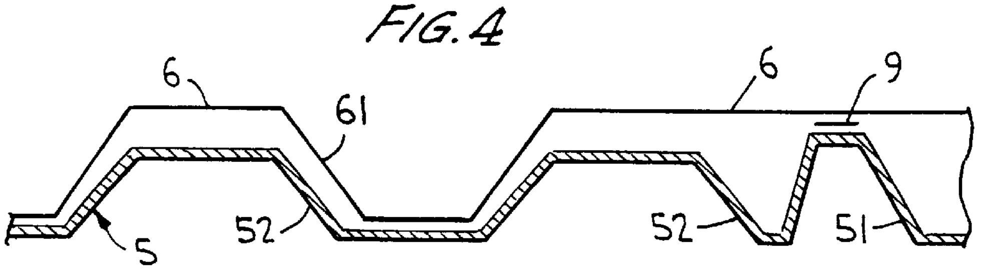
FIG. 4 is a partial section of the multi-layer sheet manufactured by this method.

FIG. 4 is a partial sectional view of the multi-layer sheet 100 so made. The ply 5 comprises first protrusions 51 and second protrusions 52 of slightly lesser height made respectively by the salient elements 10 and 12. As shown by the embodiment of the Figure, the latter exceeds half of that of the protrusions 51. The ply 6 in turn comprises so-called third protrusions 61 made by the salient elements 14. In the embodiment shown, they are essentially of the same height as the first protrusions 51 and, outside the zones occupied by the first protrusions, they nest between the ply's second protrusions 52. Ply 5 is bonded to ply 6 between two protrusions 61 by the tips of protrusions 51 by means of an adhesive layer 9.

Thanks to the solution of the invention, namely two level embossing of one of the plies, it is possible also to make multi-layer sheets of which the appearance can be improved further by coloring the adhesive.

In another embodiment of the invention (not shown), the second cylinder comprises salient third and fourth elements which, following embossing the second ply, produce third and fourth protrusions at the latter's surface. The heights H' and h' of the salient elements preferably follow the same relationship as exists between H and h, namely $0.5\,H \leqq h' \leqq H' - 0.05$.

In another embodiment (not shown), the two steel cylinders are positioned in such a manner that they mesh with one another. As regards the solution of FIG. 1, this feature ensures proper positioning of the ply 6, namely the ply borne by the cylinder unassociated with the laminator roll, relative to the other ply's protrusions. Because of the cylinder meshing, the two plies are guided toward one another until they are assembled. This design offers special significance when an adhesive deposition system is provided for each embossing group. Moving the steel cylinders toward each other so that they mesh already makes it possible at this level to combine somewhat the plies. Thanks to the second adhesive depositing system, this design is useful when it is desired to increase the number of junction spots between the two layers.

We claim:

1. An absorbent multi-layer sheet comprising at least two layers with each layer including at least one embossed absorbent ply having a specific surface weight of between 10 to 40 $g/m^2$ per ply, an external surface of each of a first layer and a second layer of said at least two layers each forming an outer side of the multi-layer sheet, and an inner surface; wherein the inner surface of the first layer comprises first protrusions and second protrusions and an inner surface of the second layer comprises third protrusions nested between the first protrusions of the first layer, the first layer and the second layer being joined to each other by at least some protrusion tips of the first layer being adhesively bonded to the second layer between two protrusions of the second layer, said second protrusions of the first layer having a height less than a height of the first protrusions and said second protrusions having tips which are free of adhesive.

2. Sheet according to claim 1 wherein the height of the second protrusions exceeds 50% of the height of the first protrusions.

3. Sheet according to claim 1 or 2 wherein the first protrusions are distributed in a spaced pattern wherein a second protrusion is positioned between two consecutive first protrusions.

4. Sheet according to claim 1 wherein adhesive on tips of the first protrusions covers an area of 0.1 to 20% of the ply surface.

5. Sheet according to claim 4 wherein said area covered by adhesive is between 1 and 5% of the ply surface.

6. Sheet according to claim 1 wherein the third protrusions have a height equal to or less than the height of the first protrusions.

7. Sheet according to claim 1 wherein the second layer further comprises fourth protrusions having a height which is at least 50% of the height of the third protrusions.

8. Sheet according to claim 6 or 7 wherein tips of the third protrusions following application of adhesive to the tips form an adhesive bond with the first layer.

9. A method for manufacturing a multi-layer sheet as claimed in claim 1 comprising embossing a first absorbent ply on a first cylinder having a surface containing salient first elements and second elements, embossing a second absorbent ply on a second cylinder having a surface containing salient third elements, depositing adhesive on at least some tips of the first protrusions, bringing the first absorbent ply and the second absorbent ply adjacent each other in such a manner that protrusions of the first absorbent ply nest between protrusions of the second absorbent ply and adhesive covered tips of the first protrusions adhere to the second ply between two protrusions therein, wherein the first elements have a height H and the second elements have a height h with the height H exceeding the height h such that difference between H and h is greater than 0.05 mm.

10. Method according to claim 9 wherein the difference between H and h is less than 50% of H where H is between 1 and 2 mm.

11. Method according to claim 9 or 10 wherein the salient third elements on the second cylinder have a height H' which is equal to or less than H.

12. Method according to claim 11 wherein the surface of the second cylinder includes salient fourth elements having a height h' which is less than the height H' of the third elements.

13. Method according to claim 12 wherein H' and h' follow a relationship of $0.5 \times H' \leqq h' \leqq H' - 0.05$.

14. Method according to claim 12 or 13 wherein the height of H of the salient first elements is equal to the height H' of the third elements and an adhesive is deposited onto tips of the third protrusions.

15. Method according to claim 14 wherein an adhesive is simultaneously deposited onto the first protrusions and the third protrusions.

* * * * *